United States Patent Office 3,043,664
Patented July 10, 1962

3,043,664
PRODUCTION OF PURE SILANE
Robert W. Mason, Morris Plains, and Donald H. Kelly, Gladstone, N.J., assignors to Allied Chemical Corporation, New York, N.Y., a corporation of New York
No Drawing. Filed June 9, 1958, Ser. No. 740,548
5 Claims. (Cl. 23—204)

This invention relates to the production of silane and more particularly refers to a new and improved method of preparing pure silane free of deleterious diborane.

Silicon can be produced by the thermal or heat decomposition of silane ($SiH_4$). In order to obtain silicon in an extremely pure state by such thermal decomposition, which is essential when the silicon is to be utilized in certain important electrical devices wherein low electrical conductivity values are a prerequisite, it is essential that a pure silane be decomposed.

Silane has been produced heretofore by the reaction of silicon tetrachloride and lithium aluminum hydride in a solvent medium. However, the product silane tends to contain diborane as an impurity, such diborane being formed from boron compounds, e.g. boron trichloride, present as impurities in the reaction mixture. The diborane, which is a volatile hydride of boron, is thermally decomposed to form boron and hydrogen during the thermal decomposition of silane, the boron appearing as an impurity in the product silicon. Boron is one of the most detrimental impurities in silicon from an electrical standpoint, and the removal of the boron from solid silicon by known purification processes is complicated, expensive and generally unsatisfactory.

Efforts to produce diborane-free silane by reaction between silicon tetrachloride containing boron trichloride and sodium aluminum hydride in tetrahydrofuran as a solvent medium have not been successful, inasmuch as gaseous silane containing a considerable amount of diborane has been produced by such reaction.

It is an object of this invention to provide a more efficient and economical process for the production of pure, diborane-free silane.

Other objects and advantages will be apparent as the invention is hereinafter described.

In accordance with the present invention, pure silane can be produced by reacting a silicon halide with an alkali metal aluminum hydride in a solvent medium in the presence of a minor amount of an alkaline earth metal aluminum hydride, preferably calcium aluminum hydride, the alkaline earth metal aluminum hydride serving to prevent the formation of diborane from a boron compound present as an impurity in the reaction mixture. The pure silane is characterized by being free of objectionable diborane and other impurities thereby enabling its thermal decomposition to obtain pure silicon free of deleterious boron and other impurities. Such production is also characterized by reduced operating cost and low capital investment.

The calcium aluminum hydride is obtained in known manner as a suspension or solution by refluxing calcium hydride in suspension in a liquid such as tetrahydrofuran with aluminum chloride in solution in a solvent such as tetrahydrofuran for a prolonged period, e.g. 6 hours. The reaction appears to be stepwise in nature, calcium chloride and aluminum hydride being first produced and the aluminum hydride then reacting with more calcium hydride to produce calcium aluminum hydride. The equations for such reaction follow:

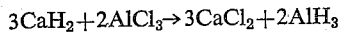

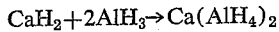

Magnesium, barium, strontium or beryllium aluminum hydride could be employed as a suspension or solution in the invention, if desired, in place of the calcium aluminum hydride suspension or solution. Suspensions or solutions of such alkaline earth metal aluminum hydrides could be prepared by a procedure similar to that previously described for preparing calcium aluminum hydride.

Examples of alkali metal aluminum hydrides which are utilized as solutions are sodium aluminum hydride and potassium aluminum hydride. Lithium aluminum hydride could also be utilized. The sodium complex is preferred. Sodium and lithium aluminum hydride are obtainable in commerce. Potassium aluminum hydride can be prepared by reacting potassium hydride with anhydrous aluminum chloride in diethyl ether or tetrahydrofuran in accordance with the equation:

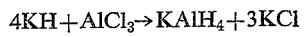

Silicon halides suitable for employment in the reaction are silicon tetrachloride, silicon tetrabromide, trichlorosilane and silicon tetrafluoride. The chlorides are preferred at this time because they are more commercially attractive. Among the chlorides, the tetrachloride is preferred because of ease of handling.

The reaction is preferably brought about by admixing or adding a solution of silicon halide such as silicon tetrachloride in a solvent such as tetrahydrofuran, to a solution or suspension of alkali metal aluminum hydride such as sodium aluminum hydride in a solvent such as tetrahydrofuran, the last-mentioned solution containing a minor amount of an alkaline earth metal aluminum hydride such as calcium aluminum hydride. Preferably a stream of previously purified carrier gas, e.g. helium, argon or nitrogen is passed through the reaction vessel, prior to addition of reactants, to drive air out of the same. Reaction occurs in the admixture and product silane ($SiH_4$) is evolved as a gas from the liquid reaction mixture. If desired, the reaction mixture may be refluxed under previously purified gas inert to silane, e.g. helium, argon, nitrogen or hydrogen. The product silane is characterized by being pure and free of the deleterious diborane. The product silane gas is withdrawn or recovered from the reaction zone or vessel, for example, by passing the gas out of an upper portion thereof or by sweeping the gas from the zone or vessel with a stream of the aforementioned previously purified gas inert to silane. Although not essential, the product silane may, if desired, be subjected to further purification treatment such as fractionation. The equation for the reaction between the sodium aluminum hydride and silicon tetrachloride to yield silane is believed to be:

While it is not known with certainty in what manner the alkaline earth metal aluminum hydride prevents formation of the objectionable diborane, a possible explanation is that the alkaline earth metal complex chemically combines with or ties up the boron compounds as high boiling compounds.

Reaction temperatures between about 10° C. and the refluxing temperature of the liquid solvent can be employed, and reaction temperatures between about 10° C. and 30° C. are preferred. Apparatus used for the production such as reaction vessels, flasks, conduits, etc., is preferably fabricated of high purity silica which is free of boron or other material which may form a significant impurity in silane and silicon produced therefrom.

The solution of alkali metal aluminum hydride containing alkaline earth metal aluminum hydride can be prepared as follows. The alkali metal complex such as sodium aluminum hydride is dissolved in predetermined or desired amount in a solvent such as tetrahydrofuran.

Refluxing may be employed during such dissolving. The resulting solution is then admixed with the alkaline earth metal aluminum hydride solution or suspension such as the calcium aluminum hydride solution or suspension in tetrahydrofuran prepared as previously described, and containing a known quantity of the alkaline earth metal complex. Refluxing may also be employed here, if desired.

Other solvents including ethers such as dimethyl ether and diethyl ether can be used in place of tetrahydrofuran for forming solutions or suspensions of the reactants. However, tetrahydrofuran is preferred.

The boron compounds, e.g. boron trichloride and sodium borohydride, tend to be present in the reaction mixture as impurities in small or minor amounts, e.g. between 0.0001% and 0.005% by weight (calculated as boron), by reason of being associated with or contained in the silicon halide (or possibly in the alkali metal aluminum hydride or the solvent). Minor amounts of alkaline earth metal aluminum hydride such as calcium aluminum hydride effective for preventing or suppressing formation of diborane from boron compound impurities present in amounts within the aforesaid percentage range are from 0.00001% to 0.0005% by weight of such alkaline earth metal complex, based on the weight of the silicon halide such as the tetrachloride. However, it is recognized that larger amounts of such boron compounds than the aforesaid range can be present as impurities and, hence, such alkaline earth metal aluminum hydride is preferably utilized in amounts of from about 0.00001% to 1.5% by weight. While more than 1.5% can be used and is included within the broader concepts of the invention, no advantage is provided thereby and such excess amounts tend to be disadvantageous from an economic standpoint. Use of amounts much less than 0.00001% should be avoided so as to insure production of pure diborane-free product. While all of the alkaline earth metal aluminum hydride may not pass into solution, the presence of non-dissolved alkaline earth metal complex (in addition to dissolved complex) in the reaction mixture is advantageous both from the standpoint of insuring combining or tying up of all boron compounds and for providing reserve calcium complex for dissolution to replace any alkaline earth metal complex precipitating out of solution as higher boiling reaction product. It was surprising and unexpected to find that such a small quantity of alkaline earth metal aluminum hydride as that equivalent to one-tenth by weight of the amount of boron impurities present is wholly effective to prevent formation of the deleterious diborane.

It is to be understood that it is not essential to employ an amount of alkali metal aluminum hydride in the instant reaction in excess over the stoichiometric amount required for reaction with all the silicon halide. The reason for this is that the alkaline earth metal aluminum hydride is the agent which prevents formation of diborane from boron compounds present as impurities. Hence the exact or even slightly less than the aforesaid stoichiometric amount can be used, if desired, although such slightly less amounts are less preferred because their use results in lower yields. Of course, an excess over this stoichiometric amount of the alkali metal complex can be employed but would provide no material advantage.

The pure silane obtained by virtue of this invention can be thermally decomposed in known manner to produce substantially pure silicon. The gaseous silane is passed into a zone or reactor heated to at least 500° C., which is the decomposition temperature of the silane but below the melting point of silicon. Preferably the temperature should not be higher than 1000° C. The silane is decomposed to deposit pure silicon on the walls of the reactor which is preferably fabricated of fused quartz, by-product hydrogen being withdrawn therefrom. The deposited silicon is then separated from the walls of the reactor. Any silica that may be attached to the silicon is removed by leaching in strong hydrofluoric acid. The silicon is then melted in a fused quartz crucible and the melt transferred to a fused quartz tube of approximately ½" I.D. to obtain a silicon rod. The rod is zone refined in a zone refining apparatus and electrical resistivity tests are then made in the conventional way.

The following examples further illustrate the invention. Parts and percentages in all examples are by weight unless otherwise stated.

*Example 1*

One hundred (100) parts of silicon tetrachloride containing about 0.0001% of boron trichloride as an impurity was added to a solution or suspension of 31.8 parts of sodium aluminum hydride and 1.5 parts of calcium aluminum hydride (based on the silicon tetrachloride) in 100 parts by volume of tetrahydrofuran, contained in a 3 neck flask provided with a sealed agitator, a pressure equalizing addition funnel and a nitrogen inlet. Prior to admixing of reactants, a stream of previously purified nitrogen was passed through the flask to sweep out air. The reagents were allowed to react for 2 hours at room temperature. The evolved gas was then withdrawn from the flask through an activated charcoal trap to remove hydrocarbons. The silane was identified by vapor phase chromatography and by its infrared absorption spectrum.

The gaseous silane was thermally decomposed at 800° C. following the method previously described to obtain silicon. Such silicon was found to have an electrical resistivity value of about 200 ohm-cm., which evidences that the silicon is substantially pure and free of deleterious boron and that the silane was pure and free of deleterious diborane.

*Example 2*

The procedure of Example 1 was repeated except that 100 parts of silicon tetrachloride containing about 0.005% of boron trichloride as an impurity was added to a solution or suspension of 31.8 parts of sodium aluminum hydride and 0.00005 part of calcium aluminum hydride (based on the silicon tetrachloride) in 100 parts by volume of tetrahydrofuran. The flask was provided with a reflux condenser (prior to admixing) and the mixture was refluxed for 2 hours. The evolved gas was then withdrawn from the flask. The silane was identified by vapor phase chromatography and by its infra-red absorption spectrum.

The silicon obtained as a product from the thermal decomposition of this silane gas as aforesaid was found to have an electrical resistivity value of about 195 ohm-cm., thereby evidencing that the silicon is substantially pure and free of deleterious boron and that the silane was pure and free of deleterious diborane.

*Example 3*

The procedure of Example 1 was repeated except that 100 parts of silicon tetrachloride containing about 0.0001% of boron trichloride as an impurity was added to a solution or suspension of 31.8 parts of sodium aluminum hydride in 100 parts by volume of tetrahydrofuran. No calcium aluminum hydride was present in the reaction mixture. The reagents were allowed to react 2 hours at room temperature. The evolved gas was identified by vapor phase chromatography and by its infra-red absorption spectrum to be primarily silane and was subsequently establshed to be silane containing impurities such as diborane.

Silicon obtained as a product from the thermal decomposition of this silane gas was found to have an electrical resistivity of less than 1 ohm-cm., which evidences that the silicon is more impure (than that of preceding examples) and contains impurities including boron, and that the silane was more impure and contained impurities such as diborane.

The following examples further show the outstanding or complete prevention or suppression of diborane formation by an alkaline earth metal aluminum hydride of this invention as contrasted with the unsatisfactory or approximately 50% prevention and substantially no prevention of diborane formation by lithium aluminum hydride and sodium aluminum hydride respectively, from a boron compound impurity having a tendency to be present in the reaction mixture of the invention.

*Example 4*

A solution of 2.5 parts of boron trichloride in 100 parts by volume of tetrahydrofuran was added to a solution of 0.53 part of lithium aluminum hydride in 100 parts by volvume of tetrahydrofuran contained in a 3 neck flask provided with a sealed agitator, a pressure equalizing addition funnel and a mercury manometer. The empty closed system had a volume of 1704 cc. The pressure as measured by the manometer and corrected to standard temperature was 50 mm. The theoretical vapor pressure of the diborane produced according to equation:

$$3LiAlH_4 + 4BCl_3 \rightarrow 2B_2H_6 + 3LiCl + 3AlCl_3$$

was calculated and found to be 104.9 mm. of Hg (assuming no boron is tied up as high boiling compound). Thus only about 50% of the boron was tied up, apparently as lithium borohydride, and the substantial remainder was present as diborane.

*Example 5*

A solution of 2.5 parts of boron trichloride in 100 parts by volume of tetrahydrofuran was added to a solution of 0.75 part of sodium aluminum hydride and 0.03 part of calcium aluminum hydride in 100 parts by volume of tetrahydrofuran contained in the equipment used in Example 4. No measurable pressure was obtained after allowing the reaction to proceed for two hours, which indicated that the production of diborane was completely inhibited or suppressed by the addition of the calcium aluminum hydride.

*Example 6*

A solution of 2.5 parts of boron trichloride in 100 parts by volume of tetrahydrofuran was added to a solution of 0.75 part of sodium aluminum hydride in 100 parts by volume of tetrahydrofuran contained in the equipment employed in Example 4. The corrected pressure obtained was 104 mm. Hg, which indicated that there was substantially no suppression of diborane formation.

Silicon produced from silane of the instant invention can be used as semi-conductor material in rectifiers, transistors, etc.

Although certain preferred embodiments of the invention have been disclosed for purpose of illustration, it will be evident that various changes and modifications may be made therein without departing from the scope and spirit of the invention.

What is claimed is:

1. A process for the production of silane free of deleterious diborane, which comprises reacting a silicon halide with an alkali metal aluminum hydride in a solvent medium of the group consisting of tetrahydrofuran, dimethyl ether and diethyl ether in the presence of a minor amount, sufficient to prevent formation of diborane from a boron compound present as an impurity in the reaction mixture, of an alkaline earth metal aluminum hydride, said minor amount being about one tenth by weight of the amount of boron impurity, and removing diborane-free gaseous silane.

2. A process for the production of silane free of deleterious diborane, which comprises reacting a silicon chloride with an alkali metal aluminum hydride in a solvent medium of the group consisting of tetrahydrofuran, dimethyl ether and diethyl ether in the presence of a minor amount, sufficient to prevent formation of diborane from a boron compound present as an impurity in the reaction mixture, of an alkaline earth metal aluminum hydride, said minor amount being about one tenth by weight of of the amount of boron impurity, and removing diborane-free gaseous silane.

3. A process for the production of silane free of deleterious diborane, which comprises reacting silicon tetrachloride with an alkali metal aluminum hydride in tetrahydrofuran as solvent medium in the presence of a minor amount, sufficient to prevent formation of diborane from a boron compound present as an impurity in the reaction mixture, of calcium aluminum hydride, said minor amount being about one tenth by weight of the amount of boron impurity, and removing diborane-free gaseous silane.

4. The process of claim 3 wherein the alkali metal aluminum hydride is sodium aluminum hydride.

5. The process of claim 3 wherein the alkali metal aluminum hydride is potassium aluminum hydride.

References Cited in the file of this patent

UNITED STATES PATENTS

| | | |
|---|---|---|
| 2,550,985 | Finholt | May 1, 1951 |
| 2,576,311 | Schlesinger et al. | Nov. 27, 1951 |
| 2,888,328 | Wilson | May 26, 1959 |

FOREIGN PATENTS

| | | |
|---|---|---|
| 793,718 | Great Britain | Apr. 23, 1958 |
| 1,022,197 | Germany | Jan. 9, 1958 |